(12) United States Patent
McCullough

(10) Patent No.: US 11,126,967 B2
(45) Date of Patent: Sep. 21, 2021

(54) DYNAMIC MARKUP LANGUAGE-DRIVEN PRODUCT ADMINISTRATION SYSTEM

(71) Applicant: The Cincinnati Insurance Company, Fairfield, OH (US)

(72) Inventor: Shane McCullough, Liberty Township, OH (US)

(73) Assignee: THE CINCINNATI INSURANCE COMPANY, Fairfield, OH (US)

( * ) Notice: Subject to any disclaimer, the term of this patent is extended or adjusted under 35 U.S.C. 154(b) by 0 days.

(21) Appl. No.: 16/406,467

(22) Filed: May 8, 2019

(65) Prior Publication Data

US 2019/0354253 A1 Nov. 21, 2019

Related U.S. Application Data

(60) Provisional application No. 62/673,429, filed on May 18, 2018.

(51) Int. Cl.
| | |
|---|---|
| *G06Q 10/10* | (2012.01) |
| *G06F 3/0484* | (2013.01) |
| *G06Q 40/08* | (2012.01) |
| *G06F 40/143* | (2020.01) |

(52) U.S. Cl.
CPC .......... *G06Q 10/10* (2013.01); *G06F 3/0484* (2013.01); *G06F 40/143* (2020.01); *G06Q 40/08* (2013.01)

(58) Field of Classification Search
CPC ..... G06F 3/0484; G06F 16/972; G06Q 30/02; G06Q 40/08
See application file for complete search history.

(56) References Cited

U.S. PATENT DOCUMENTS

| | | | |
|---|---|---|---|
| 6,941,521 B2* | 9/2005 | Lin ........................... | G06F 8/38 |
| | | | 715/234 |
| 7,333,939 B1 | 2/2008 | Stender et al. | |
| 7,707,505 B1* | 4/2010 | Ohrt ...................... | G06F 16/972 |
| | | | 715/738 |
| 7,747,945 B1 | 6/2010 | Babka et al. | |
| 7,933,784 B2 | 4/2011 | Brocci | |
| 8,010,389 B2 | 8/2011 | Wait et al. | |
| 8,176,145 B1* | 5/2012 | Stender ................. | G06Q 40/08 |
| | | | 709/219 |
| 8,584,139 B2 | 11/2013 | Katz et al. | |
| 8,650,051 B2 | 2/2014 | Jones et al. | |
| 8,731,973 B2 | 5/2014 | Anderson et al. | |
| 9,098,504 B2* | 8/2015 | Price ...................... | G06F 16/84 |
| 9,305,316 B2 | 4/2016 | Guyan et al. | |

(Continued)

FOREIGN PATENT DOCUMENTS

AU 2014259564 A1 5/2016

OTHER PUBLICATIONS

Nathalie Souchon et al. Areview of XML-complaint UI description language Jan. 1, 2003 (Year: 2003).*

(Continued)

*Primary Examiner* — Cao H Nguyen
(74) *Attorney, Agent, or Firm* — Middleton Reutlinger

(57) ABSTRACT

A product and/or service request administration system and methods related thereto define products and/or service requests using markup language documents that are dynamically interpreted by a computer-implemented engine to generate user interface screens for use in administering products and/or service requests.

19 Claims, 10 Drawing Sheets

(56) References Cited

U.S. PATENT DOCUMENTS

| | | |
|---|---|---|
| 9,760,951 B2 | 9/2017 | Widener et al. |
| 2001/0049611 A1 | 12/2001 | Peach |
| 2002/0055862 A1 | 5/2002 | Jinks |
| 2002/0198743 A1* | 12/2002 | Ariathurai .............. G06Q 30/02 705/4 |
| 2004/0093242 A1 | 5/2004 | Cadigan et al. |
| 2004/0186750 A1 | 9/2004 | Surbey et al. |
| 2004/0193455 A1 | 9/2004 | Kellington |
| 2006/0015847 A1* | 1/2006 | Carroll, Jr. ................ G06F 8/38 717/109 |
| 2009/0210258 A1 | 8/2009 | Cardot et al. |
| 2009/0210259 A1 | 8/2009 | Cardot et al. |
| 2010/0106533 A1 | 4/2010 | Alvarez |
| 2012/0072242 A1 | 3/2012 | Fiori et al. |
| 2012/0232934 A1 | 9/2012 | Zhang et al. |
| 2012/0232939 A1 | 9/2012 | Pierre et al. |
| 2014/0229205 A1 | 8/2014 | Gibson |
| 2015/0254780 A1 | 9/2015 | Propati et al. |
| 2015/0310648 A1* | 10/2015 | Matange ................ G06Q 10/00 345/440 |

OTHER PUBLICATIONS

Nathalie Souchon et al: "A review of XML-compliant User Interface Description Languages" International Conference on Computer Analysis of Images and Patterns. CAIP 2017: Computer Analysis of Images and Patterns, vol. 2844, pp. 377-391, Jan. 1, 2003.

International Search Report and Written Opinion issued in Application No. PCT/US2019/031285 dated Aug. 7, 2019.

Business Wire, Haley Introduces Knowledge-Pak with Pre-Loaded Business Rules Vocabulary for ACORD P&C Insurance Standard; Offers Carriers, Third-Party Transaction Providers, and ISVs a Fast Track to Insurance Standard-Compliant Business Rules Management, Business Wire, May 23, 2005.

M2 Presswire, Mercator Software: Mercator announces ACORD XML integration software to accelerate XML adoption within insurance industry—new capabilities dramatically reduce cost to integrate both XML and EDI transactions with insurance applications using ACORD standards, Normans Media Ltd, Mar. 22, 2000.

* cited by examiner

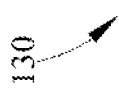

FIG. 6

| Actual Parameters of call to BOP Building Coverage Screen Layout1 (return type: Boolean) | | | | | |
|---|---|---|---|---|---|
| Specify a value for every Parameter of Rule 'BOP Building Coverage Screen Layout1' (use drag and drop for NavPaths and initial Expression) | | | | | |
| # | Parameter | Type | In/O... | Optiona... | Navigational Path Expression | Flavour |
| 1 | Limit | Integer | In | Required | 'BOP Building Coverage'.Limit | Expres... |
| 2 | Valuation | String | In | Required | 'BOP Building Coverage'.Valuation | Expres... |
| 3 | Square Footage | Object | In | Required | 'BOP Building Coverage'.'Square Footage' | Expres... |

| Actual Parameters of call to BOP Building Coverage Premium Rating1 (return type: Void) | | | | | |
|---|---|---|---|---|---|
| Specify a value for every Parameter of Calculation 'BOP Building Coverage Premium Rating1' (use drag and drop for NavPaths and initial Expression) | | | | | |
| # | Parameter | Type | In/O... | Optiona... | Navigational Path Expression |
| 1 | Base Rate | Decimal | In | Required | 'BOP Building Coverage Premium Detail'.'Base Rate' |
| 2 | Business Liability Limit Factor | Decimal | In | Required | 'BOP Building Coverage Premium Detail'.'Business Liability Lim... |
| 3 | Base Rate Plus Business Liability Limit Factor | Decimal | Out | Required | 'BOP Building Coverage Premium Detail'.'Base Rate Plus Busin... |
| 4 | Property Deductible Factor | Decimal | In | Required | 'BOP Property Location'.'Property Deductible Factor' |
| 5 | Sprinklered Factor | Decimal | In | Required | 'BOP Property Building'.'Sprinklered Factor' |
| 6 | Experience Factor | Decimal | In | Required | 'BOP Rate Modification Information'.'Experience Factor' |
| 7 | Schedule Factor | Decimal | In | Required | 'BOP Rate Modification Information'.'Schedule Factor' |
| 8 | Expense Factor | Decimal | In | Required | 'BOP Rate Modification Information'.'Expense Factor' |
| 9 | Other Factor | Decimal | In | Required | 'BOP Rate Modification Information'.'Other Factor' |
| 10 | Limit Per 100 | Decimal | In | Required | 'BOP Building Coverage Premium Detail'.'Limit Per 100' |
| 11 | Subtotal Premium | Premium | Out | Required | 'BOP Building Coverage Premium Detail'.'Subtotal Premium' |
| 12 | LPDP Factor | Decimal | In | Required | 'BOP Rate Modification Information'.'LPDP Factor' |
| 13 | Premium | Premium | Out | Required | 'BOP Building Coverage Premium Detail'.Premium |

*FIG. 9*

Building Coverage 192

| Coverage Detail | Premium Summary | | | | |
|---|---|---|---|---|---|
| | | Details | Premium | Premium | Premium |
| ▽ Building Coverage Premium | | 288 | | | |
| ▽ Subtotal Premium | | 288 | | | |
| ▽ Base Rate ÷ Business Liability Limit Factor | | 0.447 | | | |
| Base Rate | | 0.447 | | | |
| Business Liability Limit Factor | + | 0 | | | |
| Base Rate ÷ Business Liability Limit Factor | = | 0.447 | | | |
| Property Deductible Factor | × | 0.43 | | | |
| Sprinklered Factor | × | 1 | | | |
| Experience Factor | × | 1.000 | | | |
| Schedule Factor | × | 1.000 | | | |
| Expense Factor | × | 1.000 | | | |
| Other Factor | × | 1.000 | | | |
| Limit Per 100 | × | 1500 | | | |
| Subtotal Premium | = | 288 | | 288 | |
| LPDP Factor | × □ | 1.000 | | | |
| Building Coverage Premium | = | 288 | | | 288 |

*FIG. 10*

DYNAMIC MARKUP LANGUAGE-DRIVEN PRODUCT ADMINISTRATION SYSTEM

BACKGROUND

Product administration systems are generally used to create, modify and otherwise administer products, e.g., products used in some industries to represent binding obligations between those offering the products and those purchasing the products. Product administration systems in many instances are accessible to multiple users, and as such, may be web-based and accessible through a browser, or may employ a client-server model where software running on an end user's desktop computer, laptop computer, or mobile device interacts with software on an online server.

In many instances, the definitions of products supported by a product administration system are hard coded into the product administration system itself, as are the user interfaces that users interact with in order to administer products. Doing so, however, can present substantial overhead for system administrators, software developers, product configurators and end users alike whenever it is desirable to introduce new products or modifying existing products. In many instances, for example, introduction of a new product may require that software developers modify some of the executable software constituting the product administration system, sometimes with the assistance of product designers or configurators who are more familiar with the desired characteristics of the new product. Further, where end users interact with a product administration system through client software on a personal computer or mobile device, the individual installations of the client software may also need to be updated to support the new product. Particularly where products are routinely introduced and/or modified, the overhead associated with adapting a product administration system to accommodate the changes may be considerable.

SUMMARY

The invention addresses these and other problems associated with the art by providing a product and/or service request administration system and methods related thereto that define products and/or service requests using markup language documents that are dynamically interpreted by a computer-implemented engine to generate user interface screens for use in administering products and/or service requests.

Therefore, consistent with one aspect of the invention, a method may include receiving, by a computer-implemented engine, a markup language document defining a product specification, the markup language document including one or more containers, one or more data elements, and one or more instruction elements, each of the one or more containers defining a component of the product specification, each of the one or more data elements defining a property of the product specification, and each of the one or more instruction elements defining administration logic for the product specification, and dynamically interpreting the markup language document using the computer-implemented engine to administer the product specification. Dynamically interpreting the markup language document includes generating a plurality of user interface screens for the product specification by interpreting at least a subset of the one or more containers, one or more data elements and one or more instruction elements, transitioning between the plurality of user interface screens by interpreting at least one of the one or more instruction elements, and administering the product specification in response to user input received through the plurality of user interface screens.

In some embodiments, administering the product specification includes creating a new product based upon the product specification, and persisting the new product. Also, in some embodiments, persisting the new product includes saving the new product in a repository as a second markup language document. Further, in some embodiments, the product includes an agreement. In some embodiments, the product includes an insurance agency contract. In addition, some embodiments may also include generating a plurality of forms for the product by dynamically interpreting the markup language document.

In some embodiments, the product includes an insurance policy. In addition, in some embodiments, the computer-implemented engine includes a rating engine configured to generate a quote for the product using the markup language document, a transaction engine configured to perform a transaction with the product using the markup language document, a print engine configured to print a plurality of forms defined for the product using the markup language document, or a statistics engine configured to generate one or more statistics for the product using the markup language document. Moreover, in some embodiments, the computer-implemented engine includes a rating engine and administering the product specification in response to user input received through the plurality of user interface screens includes generating the quote for the product using the rating engine. In addition, the method further includes dynamically interpreting the markup language document using a transaction engine to perform a transaction with the product, and dynamically interpreting the markup language document using a print engine to generate a plurality of forms defined for the product.

In some embodiments, the transaction is a new business, endorsement, cancellation or reinstatement transaction for the product. Moreover, in some embodiments, at least a subset of the one or more containers, one or more data elements, and one or more instruction elements are compatible with an ACORD data model, and generating the plurality of user interface screens includes generating a first user interface screen using the subset. In some embodiments, each of at least a portion of the one or more containers defines an additional interest, building, coverage, coverage modifier, coverage option, coverage part, declaration, extension, form, line of business, location, place of insurance, premium detail, prior policy, product concept, stat detail, structural, subject of insurance, or underlying policy component. In addition, in some embodiments, each of at least a portion of the one or more instruction elements defines a conflict, construction helper, data validation, form template, form trigger, global form, issue helper, rating hint, requisite, screen hint, screen layout, screen wizard hint, screen wizard layout, stat, transaction helper, transaction rule or upgrade rule. In some embodiments, each of at least a portion of the one or more instruction elements defines an allowed value, data manipulation, lookup or rating calculation.

Moreover, in some embodiments, the product specification further defines one or more form template components and one or more form trigger components, each form template component defining print instructions for a form and each form trigger associating a form template component with an associated coverage. Also, in some embodiments, at least one of the one or more instruction elements defines a screen layout for at least one user interface screen for use in administering the product specification.

Consistent with another aspect of the invention, a method may include receiving, by a computer-implemented engine, a markup language document defining a service request specification, the markup language document including one or more containers, one or more data elements, and one or more instruction elements, each of the one or more containers defining a component of the service request specification, each of the one or more data elements defining a property of the service request specification, and each of the one or more instruction elements defining administration logic for the service request specification, and dynamically interpreting the markup language document using the computer-implemented engine to administer the service request specification. Dynamically interpreting the markup language document may include generating a plurality of user interface screens for the service request specification by interpreting at least a subset of the one or more containers, one or more data elements and one or more instruction elements, transitioning between the plurality of user interface screens by interpreting at least one of the one or more instruction elements, and administering the service request specification in response to user input received through the plurality of user interface screens. In some embodiments, the service request specification includes an insurance claim request specification.

Consistent with another aspect of the invention, a method may include defining a product specification for a product using a product diagramming technique, the product specification including one or more containers, one or more data elements, and one or more instruction elements, each of the one or more containers defining a component of the product specification, each of the one or more data elements defining a property of the product specification, and each of the one or more instruction elements defining administration logic for the product specification, and at least one of the one or more instruction elements defining a screen layout for at least one user interface screen for use in administering the product specification, automatically generating a markup language document defining at least a portion of the product specification, and persisting the markup language document in a data store.

Consistent with another aspect of the invention, a method may include defining a service request specification for a product using a product diagramming technique, the service request specification including one or more containers, one or more data elements, and one or more instruction elements, each of the one or more containers defining a component of the service request specification, each of the one or more data elements defining a property of the service request specification, and each of the one or more instruction elements defining administration logic for the service request specification, and at least one of the one or more instruction elements defining a screen layout for at least one user interface screen for use in administering the service request specification, automatically generating a markup language document defining at least a portion of the service request specification, and persisting the markup language document in a data store.

In addition, some embodiments of the invention may include an apparatus including at least one processing unit and program code configured upon execution by the at least one processing unit to perform any of the aforementioned methods. Other embodiments of the invention may include a program product including a computer readable medium and program code stored on the computer readable medium and configured upon execution by at least one processing unit to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter

BRIEF DESCRIPTION OF THE DRAWINGS

FIG. 6 illustrates a display of an example set of parameters from the product specification of FIG. 5.

FIG. 9 illustrates a display of an example set of parameters from the product specification of FIG. 5.

FIG. 10 illustrates a display of an example premium summary user interface screen generated for the product specification of FIG. 5.

DETAILED DESCRIPTION

In some embodiments discussed hereinafter, a dynamic markup language-driven product administration system may be used to manage products offered to parties and representing a portfolio of products offered by a particular party. In addition, in some embodiments a dynamic markup language-driven service request administration system may be used to manage service requests.

As will become more apparent below, the use of a dynamic markup-language driven system facilitates configuration and management of products and/or service requests by product and/or service request configurators, who may not be software developers in some instances, with the product and/or service request administration system generally being capable of adapting to new or reconfigured products with little or no additional software development for the system. Prior to a discussion of these embodiments, however, a brief overview of an example hardware and software environment suitable for implementing the herein-described concepts is provided below.

Product Administration System

Figure 1:
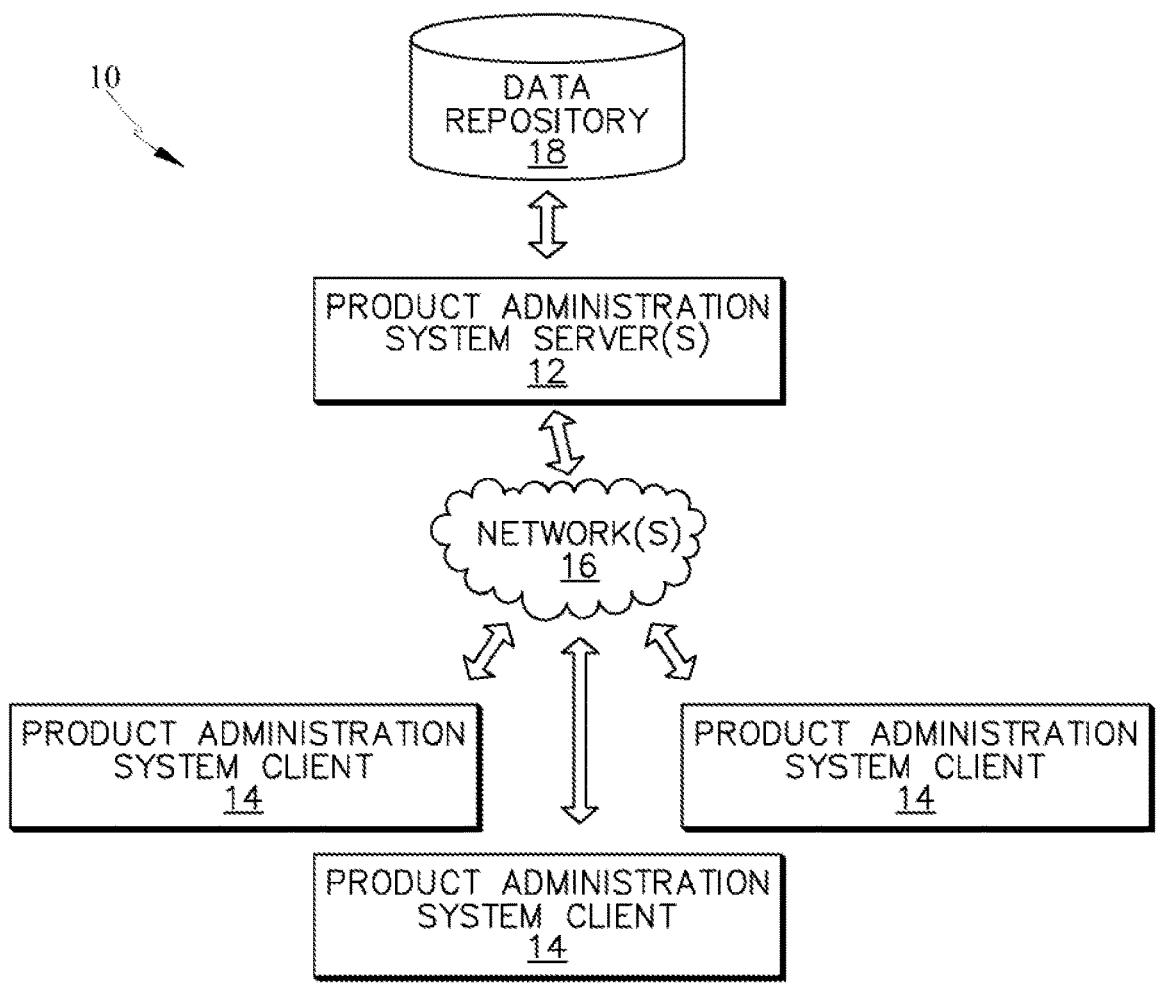
FIG. 1 is a block diagram of an example hardware and software environment for a product administration system in accordance with implementation of various technologies and techniques described herein.

In some embodiments consistent with the invention, a product administration system may be implemented in a networked computing environment. FIG. 1, for example, illustrates an example product administration system 10 in which the various technologies and techniques described herein may be implemented in some embodiments. System 10 may incorporate, for example, one or more product administration servers 12 accessible by one or more product administration system clients 14 via one or more networks 16, e.g., various wireless and/or wired networks, including private and/or public networks such as the Internet. A data repository 18, e.g., storing product configurations, client or customer data, etc., may also be accessible by servers 12. Clients 14 may be used, for example, by customers, by product configurators, by systems administrators, by developers, or by other individuals requiring access to system 10.

Each server 12 and client 14 may be implemented using one or more computers, e.g., server-type computers, desktop computers, laptop computers, tablets, mobile devices, etc., and further, in some embodiments multiple networked computer systems may be used to support a particular client, customer or administrator, e.g., through a client-server architecture, a web-based architecture, a remote desktop architecture, a virtual machine architecture, etc.

Figure 2:
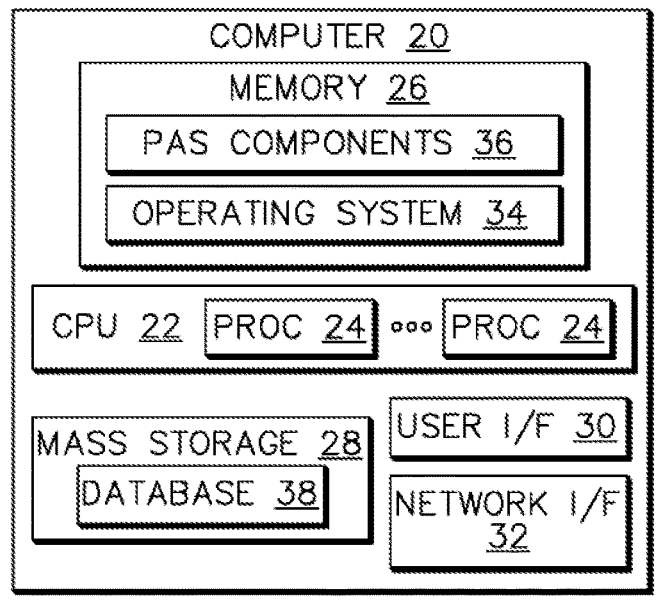
FIG. 2 is a block diagram of an example computer for use in the product administration system of FIG. 1.

FIG. 2, for example, illustrates an example computer 20 that may be used to implement a server 12 or client 14 in some embodiments. Computer 20 may include a central processing unit (CPU) 22 including at least one hardware-based processor or processor core 24. CPU 22 is coupled to a memory 26, which may represent the random access memory (RAM) devices comprising the main storage of a computer 20, as well as any supplemental levels of memory, e.g., cache memories, non-volatile or backup memories (e.g., programmable or flash memories), read-only memories, etc. In addition, memory 26 may be considered to include memory storage physically located elsewhere in a computer, e.g., any cache memory in a microprocessor or processing core, as well as any storage capacity used as a virtual memory, e.g., as stored on a mass storage device 28 or on another computer coupled to computer 20.

Computer 20 also generally receives a number of inputs and outputs for communicating information externally. For interface with a user or operator, computer 20 generally includes a user interface 30 incorporating one or more user input/output devices, e.g., a keyboard, a pointing device, a display, a printer, etc. Otherwise, user input may be received, e.g., over a network interface 32 coupled to a network, from one or more external computers. Computer 20 also may be in communication with one or more mass storage devices 28, which may be, for example, internal hard disk storage devices, external hard disk storage devices, storage area network devices, etc.

Computer 20 generally operates under the control of an operating system 34 and executes or otherwise relies upon various computer software applications, components, programs, objects, modules, data structures, etc. For example, one or more product administration system components 36 implementing a portion of the functionality of product administration system 10 may execute in computer 20, and various product administration system data, e.g., represented by database 38 in mass storage 28, may be accessed by such components. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system, kernel, middleware, hypervisor, firmware, or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers, computer systems and computing environments, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIGS. 1-2 is not intended to limit the invention. Indeed, those skilled in the art will recognize that other alternative hardware and/or software environments may be used without departing from the scope of the invention.

Dynamic Markup Language-Driven Product Administration System

Embodiments consistent with the invention utilize a dynamic markup language-driven user interface in a product administration system to facilitate the creation, modification and administration of products offered by the product administration system. A product, in this regard, may refer to various types of products capable of representing binding obligations between those offering the products and those purchasing the products.

In the embodiments discussed hereinafter, for example, products may be insurance-related products, e.g., insurance policies, for which an insurance company or other offering entity contracts with an individual, company or other legal entity to provide insurance against the occurrence of specified events. Insurance products may relate to various types of risk, e.g., property, casualty, life, disability, health, liability, etc. It will be appreciated, however, that the principles of the invention may apply to other types of products, so the invention is not limited to the particular insurance-based application described hereinafter.

As previously noted, the definitions of products supported by a product administration system are generally hard coded into the product administration system itself, as are the user interfaces that users interact with in order to administer products. By doing so, however, the additions of new products and/or the modification of existing products can present substantial overhead for system administrators, software developers, product configurators and end users alike. In many instances, for example, the introduction of a new product may require that software developers modify some of the executable software constituting the product administration system, sometimes with the assistance of product configurators who are more familiar with the desired characteristics of the new product. Further, where end users interact with a product administration system through client software on a personal computer or mobile device, the individual installations of the client software may also need to be updated to support the new product, and particularly where products are routinely introduced and/or modified, the overhead associated with adapting a product administration system to accommodate the changes may be considerable. As a further result of hard coding product definitions into a product administration system, the amount of program code needed to implement a product administration system may be on the order of millions of lines of code, potentially introducing greater numbers of errors and greater administration to ensure that the system operates as intended.

Embodiments consistent with the invention, on the other hand, may implement a computer-implemented engine within a policy administration system to dynamically interpret product specifications defined in one or more markup language documents. The markup language documents may include one or more containers, one or more data elements, and one or more instruction elements.

The containers are generally used to define components of a product specification, the data elements are generally used to define properties of the product specification, and the instruction elements are generally used to define administration logic for the product specification, including, as will be discussed in greater detail below, user interface logic for use in interfacing with a user.

The dynamic interpretation, for example, may generate one or more user interface screens for the product specification by interpreting at least a subset of the containers, data elements and instruction elements, and interpretation of the instruction elements may be used to transition between the user interface screens. Moreover, administration of the product specification may be performed in response to user input received through the generated user interface screens.

Figure 3:
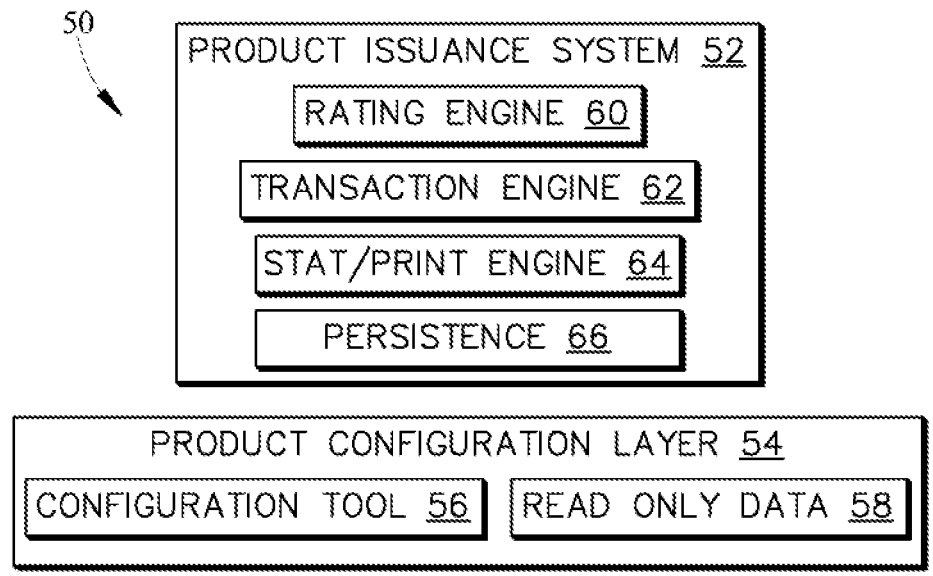
FIG. 3 is a block diagram of an example product administration system in accordance with implementation of various technologies and techniques described herein.

Now turning to FIG. 3, this figure illustrates an example product administration system 50, e.g., an insurance policy administration system, within which the herein-described techniques may be implemented. System 50 may include a product issuance system 52 that interfaces with a product configuration layer 54 including a product configuration tool 56 and a read only data repository 58. In the illustrated embodiment, the actual code base for product administration system 50 does not include any product specific business logic anywhere in core application code. Thus, for example, if a product configurator desired to describe the rules around a Commercial Fire Building Coverage (which will be appreciated to be relatively complex), the rules, rating algorithms, statistical reporting, print and form requirements, general screen flow, data element requirements, etc., will not be coded within the core application.

Within policy issuance system 52 a multitude of dynamic engines, e.g., a rating engine 60, transaction engine 62 and statistics/print engine 64, may be used to issue and administer products, e.g., insurance policies. Rating engine 60 may be used to interact with an end user to generate quotes for different policies and policy options, transaction engine 62 may be used to perform transactions such as issuing policies, issuing endorsements, canceling policies, etc., and statistics/print engine 64 may be used to generate reports and policy documents. Engines 60-64 are dynamic engines insofar as they are capable of interpreting markup language components of a product specification to dynamically generate user interface components for interaction with a user. In addition, a persistence component 66 may be used to interface with a persistent data store to store and retrieve insurance policies and other system data.

It will also be appreciated that different combinations of engines and different types of engines may be used in different embodiments. Further, various engines may support different functionality. For example, a transaction engine in some embodiments may support multiple types of transactions, e.g., including but not limited to quote, new business, endorsement, cancellation, reinstatement, and out of sequence endorsement transactions.

By arranging the components of product administration system 50 as illustrated in FIG. 3, both configurability and release speed may be improved as compared to a hard coded approach, in part due to the fact that less developer involvement is required to introduce or modify products in product administration system 50, and that product configurators with little or no software development experience may be able to introduce or modify products in many circumstances.

Configuration tool 56 in product configuration layer 54 may be used for the development and maintenance of products, which effectively operate as the blueprints from which individual items may be sold, e.g., from which insurance policies may be written. As such, particularly within product issuance system 52, little or no business rules or product-specific user interfaces are directly coded into the various components in the system, and the products configured by configuration tool 56 are instead used to drive the user interface and other product-related activities within product issuance system 52.

In the illustrated embodiment, products are defined in product administration system 50 based upon a data model that extends an industry standard diagraming technique such as the Association for Cooperative Operations Research and Development (ACORD) diagramming technique. With the ACORD diagramming technique, there are only a few basic product assembly shapes that need to be used to formulate most product blueprints. Embodiments consistent with the invention, however, may extend these basic shapes by typing the individual shapes and incorporating into those shapes the logic from which various user interface controls may be derived. Thus, for example, instead of having the product administration system know about individual insurance concepts, like a Building Coverage for a Commercial Fire Product or Uninsured Motorist Coverage for Commercial Auto, it knows about the basic types and knows how to execute the corresponding behavior and function associated with that type.

Some example product component types, for example, include Additional Interest, Building, Coverage, Coverage Modifier, Coverage Option, Coverage Part, Declarations, Extension, Form, Line of Business, Location, Place of Insurance, Premium Detail, Prior Policy, Product Concept, Stat Detail, Structural, Subject of Insurance, and Underlying Policy (among others). Some example rule types include Conflict, Construction Helper, Data Validation, Form Template, Form Trigger, Global Form, Issue Helper, Rating Hint, Requisite, Screen Hint, Screen Layout, Screen Wizard Hint, Screen Wizard Layout, Stat, Transaction Helper, Transaction Rule and Upgrade Rule (among others). Some example calculation types include Allowed Value, Data Manipulation, Lookup and Rating (among others).

The herein-described diagramming technique breaks down core concepts into two principal buckets or categories. There are data containers and their corresponding data elements and behaviors. The main data containers are represented as product components, which function as the foundational building blocks by which all insurance products can be constructed. Other data containers may include request specifications and role specifications, the former of which is used to capture details related to events in a policy life cycle, and the latter of which is used to function as a container that points out to an external data element or source.

Data elements may be represented by two principal concepts, a property specification and a constant specification. Both may be configured as single data fields that are assembled as part of a data container. Both may be similar to one another, with the exception that the value set on a constant specification may not be modified for the life of a policy.

Behaviors, also referred to herein as instruction elements, may be made up of two principal categories, rules and calculations. Rules may be used to provide logic based on a set of inputs and calculations may be used to execute mathematical functions and set one to many values as specified as an output(s).

Using these fundamental elements, various insurance products may be created with configuration tool 56 and accessed by product issuance system 52 to create individual policies. One important aspect of this approach is that product configurators may be able to control what Lines of Business, Coverages, Forms, Options, etc. can be added to a concept within a product specification. In traditional, hard coded approaches, the rules around availability, cardinality, required, etc. would all have to be programmatically designed. However, using the configuration tool and a simple shortcut rule, availability can be controlled by the system itself, and the product administration system 50 may dynamically create the available list of items or automatically add items if necessary.

Figure 4:
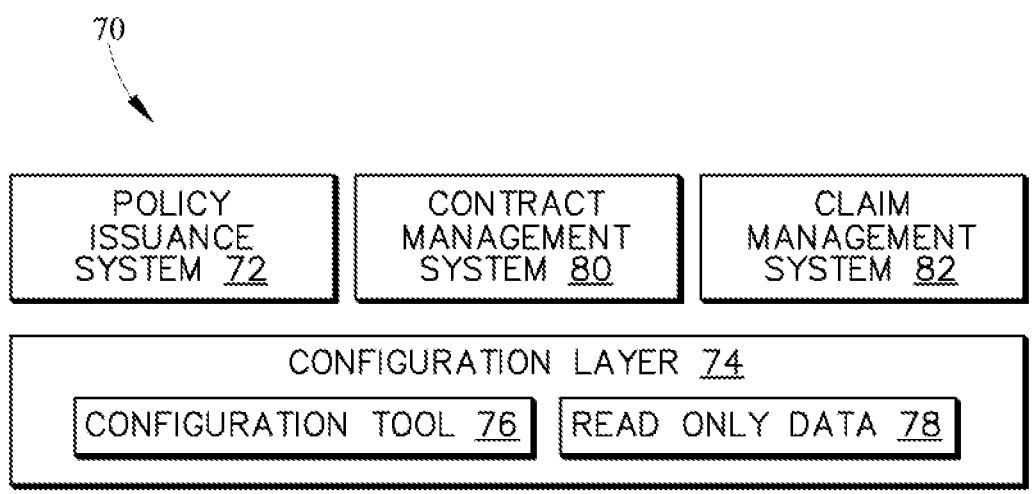
FIG. 4 is a block diagram of an example insurance administration system in accordance with implementation of various technologies and techniques described herein.

It will also be appreciated that the techniques described herein may be used in other applications. FIG. 4, for example, illustrates an insurance administration system 70 capable of functioning not only as a policy administration system (e.g., using a policy issuance system 72 similar to product issuance system 52 of FIG. 3, but also as an administration system for other types of products and/or service requests associated with the insurance industry. Also similar to product administration system 50 of FIG. 3, insurance administration system 70 may rely on a configuration layer 74 incorporating a configuration tool 76 and read only data repository 78.

For example, an additional type of product that may be managed by insurance administration system 70 is a contract or agreement such as an insurance agency contract between an insurance company and an insurance agent, e.g., using a contract management system 80. With such products, product specifications may define required and optional terms of an agreement or contract, as well as a user interface for managing such agreements.

In addition, insurance administration system 70 may also be used to manage other aspects of an insurance business, e.g., claims processing. In this regard, a claim management system 82 may be provided to administer insurance claim request specifications that manage the creation and management of insurance claims submitted to an insurer by claimants. A claim, for example, may be considered in some regards to be a type of contract between a claimant and an insurer, and as such, similar to an insurance policy, a claim request specification may be developed to control how claims are created and managed, along with a suitable user interface for performing such operations. More broadly, a claim request may be considered to be a type of service request whereby one party requests some service (here, a claim) from another party, and as such, insurance administration system 70 may also be considered to implement a service request administration system in some embodiments.

It will be appreciated that other products and/or service requests may be managed and administered using the techniques described herein. Furthermore, it will be appreciated that product administration systems and service request administration systems may be implemented in the same data processing system or in separate data processing systems in different embodiments. Therefore, the invention is not limited to the specific implementations discussed herein.

Returning again to product administration system 50 of FIG. 3, as noted above, various insurance-related products may be created with configuration tool 56 and accessed by product issuance system 52 to create individual policies, and product configurators may be able to control what Lines of Business, Coverages, Forms, Options, etc. can be added to a concept within a product specification. Moreover, availability of different items for a given product can be controlled by the system itself, and the product administration system 50 may dynamically create available lists of items or automatically add items if necessary.

Thus, for example, for a commercial general liability product specification, various required data elements may be automatically added to a policy, e.g., a location reference, a premium detail, one or more required forms, etc., while other data elements may be presented to a user and optionally added by the user, e.g., broadened endorsements, excess medical payment coverage, additional liability coverages, industry-specific coverages, etc.

Figure 5:
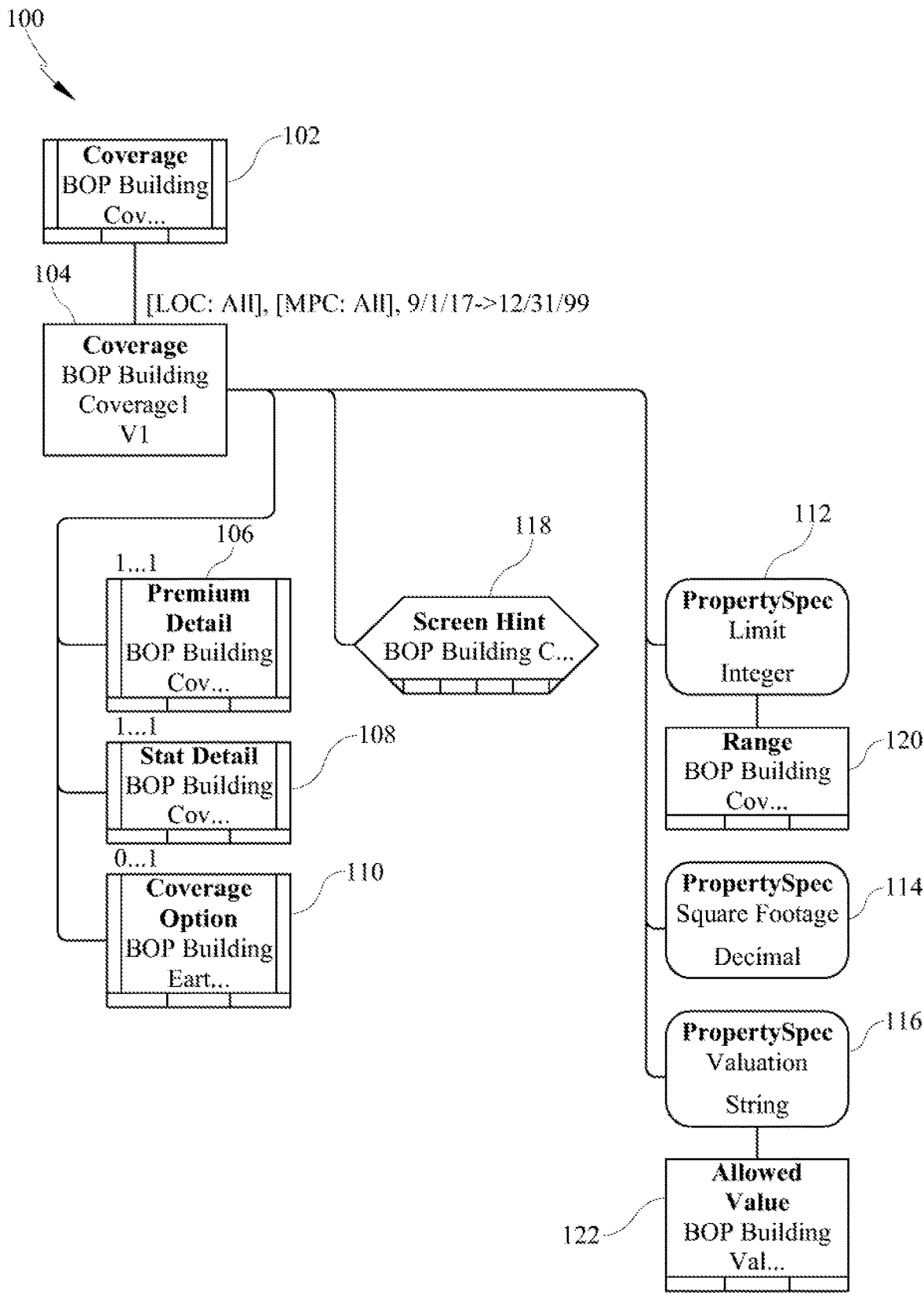
FIG. 5 illustrates a display of a portion of an example product specification administered by the product administration system of FIG. 3.

As a further illustration of this approach, FIG. 5 illustrates a portion of an example product specification 100 for a commercial fire building coverage for a businessowners package (BOP) product, including containers 102-110, data elements 112-116 and instruction element 118.

With a hard coded approach, a coverage like this would require coding to represent the screens for all the data elements, coding for the persistence of the coverage, coding for rules around availability and eligibility, coding for the pricing/rating, coding for how to send instructions to a print component, coding for instructions on what to send to downstream reporting systems for statistical and analytical reporting, among others. However, using the herein-described diagraming technique and the configuration tool, the illustrated requirements may be represented by components encoded into a markup language document and executed by engines 60-64 of product administration system 50.

Specifically, a coverage container 102 may be subtyped by a versioned coverage container 104 for version 1 (V1) of the building coverage defined by the specification. A premium detail container 106, which is required as represented by the (1 . . . 1) designation, is a data container for all premium calculations, and a statistics detail container 108 is a required data container for statistics. A coverage option data container 110, which is optional as represented by the (0 . . . 1) designation, illustrates an example optional earthquake coverage container.

For the data elements, data element 112 stores a limit property, and is typed as an integer, while data element 114 stores a square footage property that is typed as a decimal and data element 116 stores a valuation property that is typed as a string. In addition, constant data elements 120, 122 may be used to constrain data elements 112 and 116, respectively, with constant data element 120 constraining the range of limits for data element 112 and with constant data element 122 constraining the allowed values for data element 116.

Instruction element 118 is a screen hint instruction element that defines a specialized rule to define instructions that control how to render the user interface screen for the coverage defined by coverage container 102. In some embodiments, every data container may include a screen hint instruction element that lays out the screen to enable a dynamic engine to dynamically display all data elements for the rule.

Configuration tool 56 may be configured to allow a product configurator to specify all the inputs (and outputs) needed for every behavior to generate the screen hint instruction element. In the example of FIG. 5, for example, above, the screen hint instruction element needs to display to the user the limit, square footage and valuation data element. FIG. 6, for example, illustrates an example display 130 that may be generated by configuration tool 56 to enable a product configurator to input the parameters, data types, whether they are inputs or outputs, whether or not they are optional or required, and the associated data element.

Configuration tool 56 may also be configured to allow a product configurator to drag and drop data elements in the navigation path. By doing this, once the items are modelled and parameterized, then the system can automatically bind the data elements to the screen elements, thereby eliminating the need for developer interaction to have the model elements available in the screen layout. The product administration system may then look at the path of the parameters and pull the values into a persisted instance of a policy.

A screen hint instruction element in some embodiments may include a customized expression language that is used by the product administration system to dynamically paint the screen flow. In the example above, the three parameters may be displayed in some embodiments using a markup language format such as shown in Table I below:

TABLE I

Example Screen Hint Expression

```
<ScreenLayout>
    <Tab title="Coverage Detail">
        <Field name="$Limit$" />
        <Field name="$Square Footage$" />
        <Field name="$Valuation$" />
    </Tab>
</ScreenLayout>
```

Figure 7:
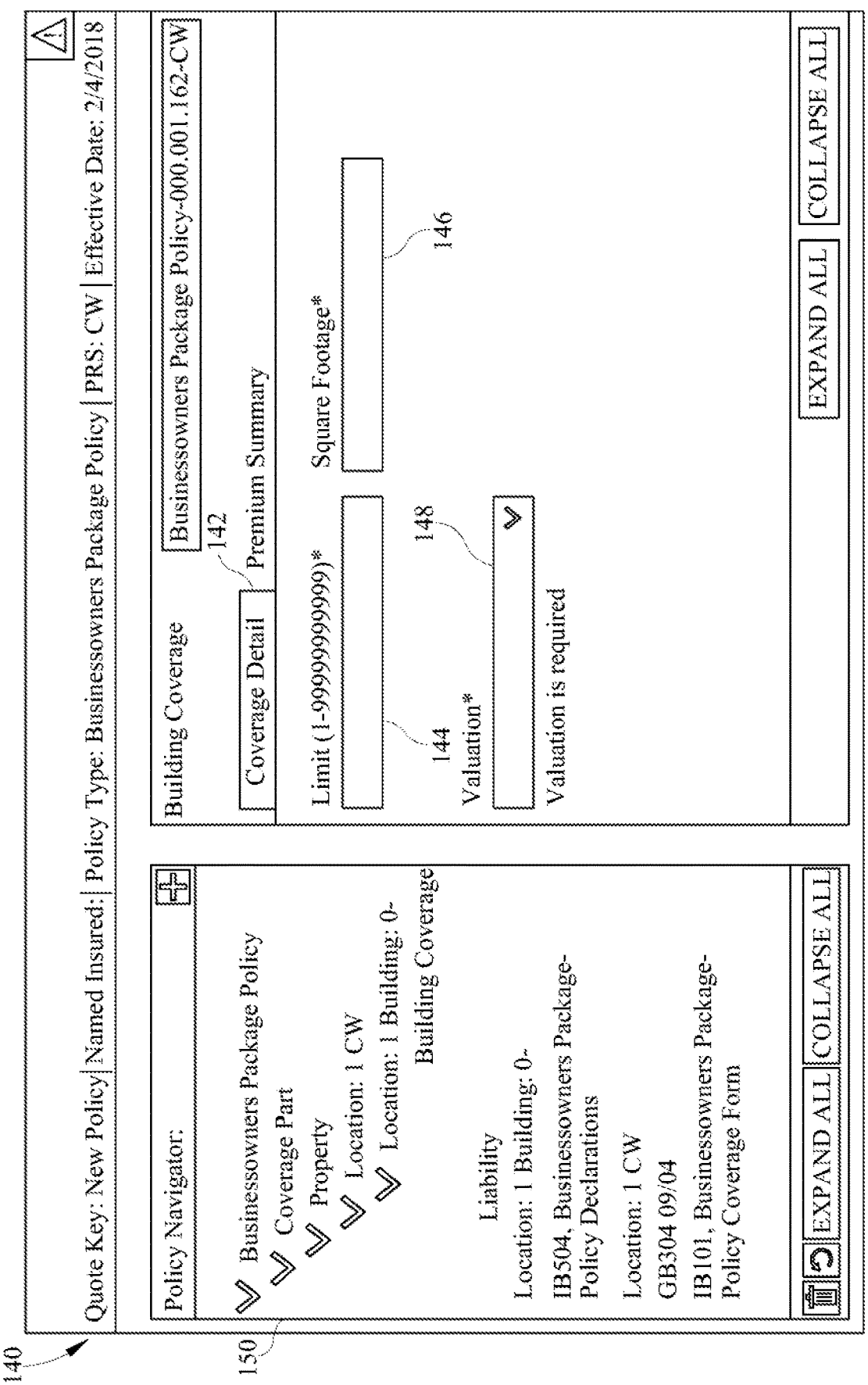
FIG. 7 illustrates a display of an example user interface screen generated for the product specification of FIG. 5.

This simple expression text may be used by engines 62-66 to render a dynamic screen with a single tab labeled "Coverage Detail" with three fields on the screen. The dynamic screen renderer may also look at the data types of the fields to render different types of user interface widgets. Square footage is a decimal, valuation has a set of allowable values and limit is set up with a value range, so once an engine reads the instructions, the screen may be rendered in the exact format specified by the product configurator using the configuration tool. FIG. 7, for example, illustrates an example display 140 including a tab 142 for coverage details and including two text boxes 144, 146 suitable for inputting limit and square footage, and a drop down list box 148 for inputting valuation information. It will be appreciated that constraints placed on a data element may likewise be implemented on a user interface screen driven by the data elements themselves. As such, the actual range of permissible limits may be displayed in the label for box 144 as per the constant data element 120 (FIG. 5), and by virtue of the inclusion of a list of allowed values for the valuation data element as defined by allowed value constant data element 122 (FIG. 5), an engine may dynamically determine that a drop down list box such as list box 148, rather than a text box, is appropriate for inputting a valuation.

Additional user interface controls may be provided on a user interface screen based upon dynamic execution of a product specification. For example, as illustrated in FIG. 7, a navigation tree 150 may be constructed to illustrate the organization of containers in the product specification.

It will be appreciated that if a product needs another data field, the data field may be simply modeled using the diagramming technique above. Once a new element is added to the model, the user may then drag that element to any rules or calculations (behaviors) that might use that element. The expression text of any behavior may also need to be modified to account for the specific instructions.

Figure 8:
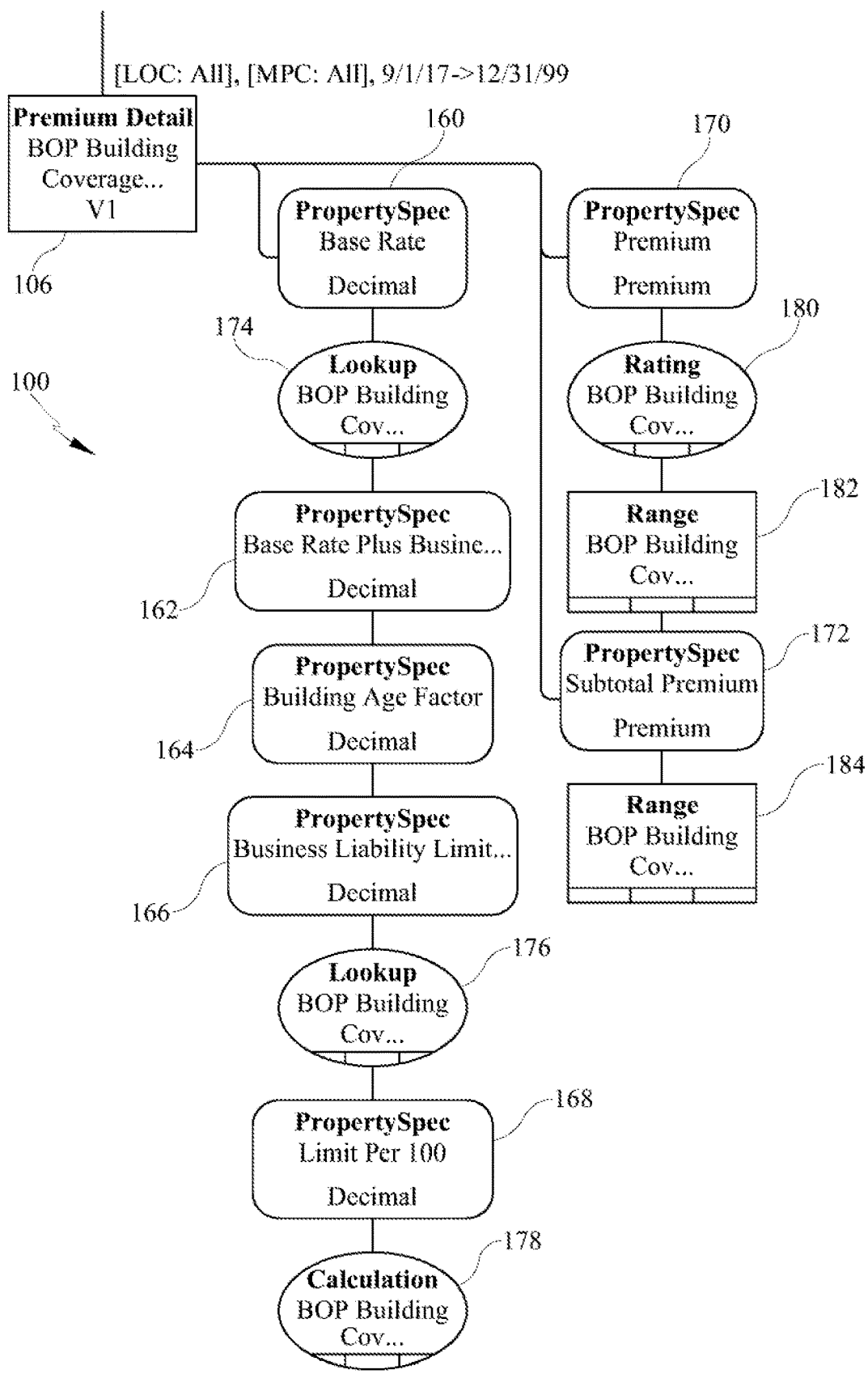
FIG. 8 illustrates a display of another portion of the example product specification of FIG. 5.

Now turning to FIG. 8, the herein-described techniques may also be used for rating calculations. In the example above, premium details for rating the building coverage may be contained within the premium detail data container 106, which is expanded in FIG. 8. Seven parameters may be defined using data elements 160-172, and calculation instruction elements 174-180 may be defined to perform calculations on these parameters. Instruction elements 174 and 176 are specifically configured as lookup instruction elements that instruct an engine to lookup a value from a meta-data repository or other external source. Thus, for example, instruction element 174 may be used to lookup a base rate based upon a state, date and policy type for the coverage.

Instruction element 178 performs a calculation for limit per 100, and instruction element 180 performs a main rating calculation for the premium to be charged for the coverage. Constant data elements 182, 184 are also included to constrain the rating calculation (data element 182) and subtotal premium (data element 184).

The parameters for the building coverage rating calculation instruction element 180 may be specified at design time, e.g., as shown by display 190 in FIG. 9, including the data types, whether they are inputs or outputs, whether they are required or optional, and the associated data element.

Table II below next illustrates example expression text that may be used to define a calculation in instruction element 180. All the parameters specified as inputs may be defined within the expression text, e.g., between tokenized "$$" symbols. The outputs may be specified in the expression text between tokenized "@@" symbols:

TABLE II

Example Calculation Expression Text

```
<Steps>
  <Step value = "@Base Rate Plus Business Liability Limit
      Factor@=$Base Rate$+$Business Liability Limit Factor$" />
  <Step value = "@Subtotal Premium@=$Base Rate Plus Business
      Liability Limit Factor$"*$Property Deductible
      Factor$*$Sprinklered
      Factorr$*$Experience Factor$*$Schedule Factor$*$Expense
      Factor$*$Other Factor$*$Limit Per 100$" />
  <Step value = "@Subtotal Premium@=fnround(@Subtotal
      Premium@,0)" />
  <Step value = "@Premium@=fnround($Subtotal Premium$*$LPDP
      Factor$,0)" />
</Steps>
```

In the rating sample above, the full algorithm may be specified at design time by the product configurator, and moreover, if the format above is used, no additional developer involvement is generally needed. The full rating is broken down into four steps. The first takes the Base Rate plus the Limit Factor. Those two inputs are added together and then the result is put in the output specified as Base Rate Plus Business Liability Limit Factor value. This value is then used as an input to the second step and so on.

In addition, in some embodiments, a premium summary worksheet may be dynamically generated based on the steps specified within the rating algorithm. This can be seen at 192 in FIG. 10, and it will be appreciated that a report generating engine may process the steps defined in the expression text above to generate the summary worksheet.

As demonstrated in both dynamic screen instructions and in the rating algorithms above, the design of product administration system in some embodiments may allow product configurators complete flexibility to design every aspect of the requirements for a product without needing developer intervention so long as the design is within the specified framework. Some additional examples of behaviors that engines may be configured to support include, but are not limited to, data manipulations, data validations, requisite rules, form triggers, statistic instructions, etc.

Figure 11:
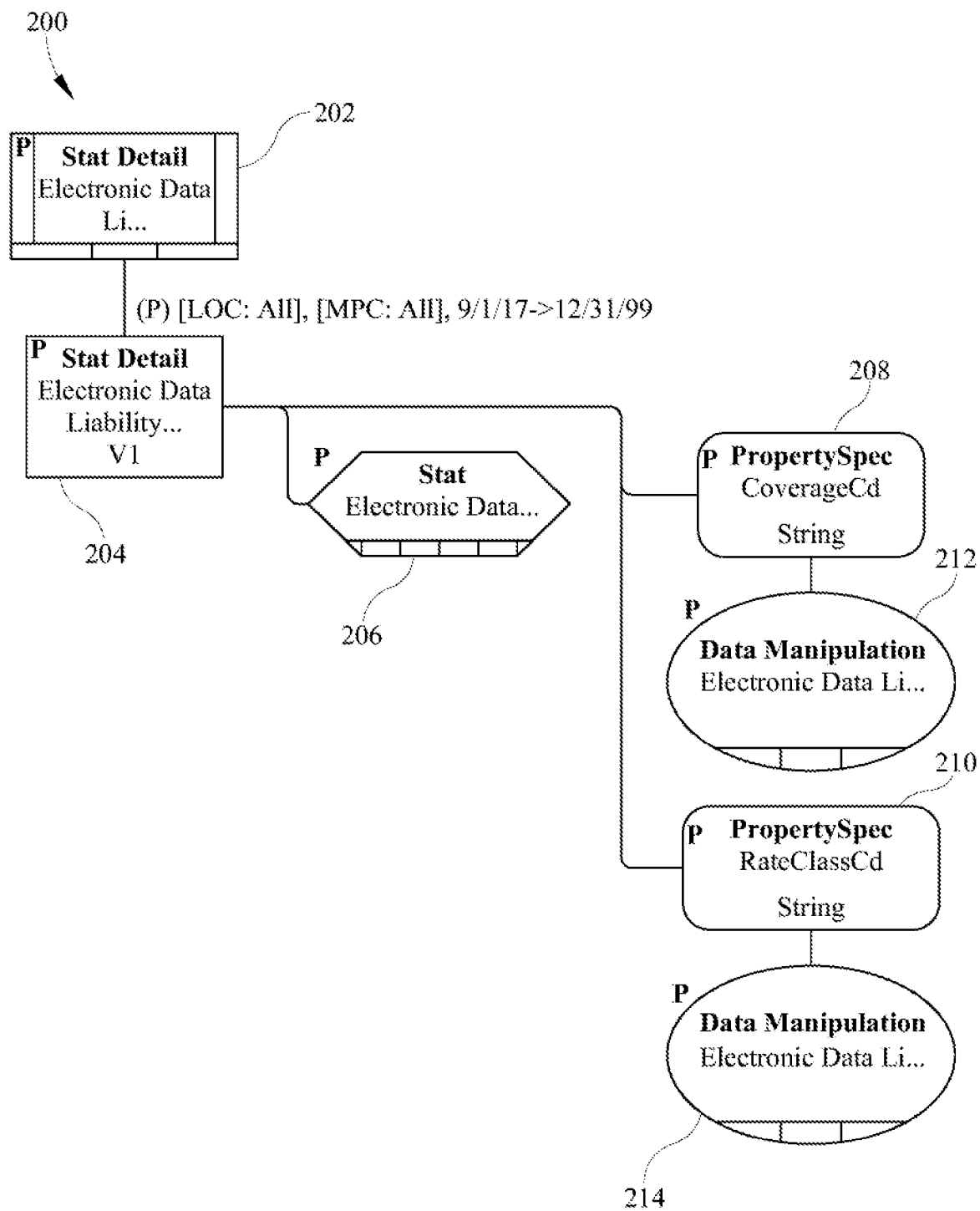
FIG. 11 illustrates a display of another portion of the example product specification of FIG. 5.

For example, for statistical reporting, it may be desirable to set the value of a coverage code differently based on the hazard grade selected by the user. This function can be accomplished using a simple data manipulation that takes the hazard grade as the input. FIG. 11, as an example, illustrates a specification 200 including a statistical detail container 202 for electronic data liability that is subtyped at 204 for a first version (V1). An instruction element 206 is defined as a statistical type rule that specifies instructions for use in statistical reporting and that takes as inputs to parameters, a coverage code and rate class code, represented by data elements 208, 210. Data manipulation instruction elements 212, 214 may be respectively provided to generate the coverage and rate class codes. For the coverage code, data manipulation instruction element 212 may be configured to take as an input a hazard grade from elsewhere in the model and set the coverage code value accordingly, e.g., using the expression text illustrated in Table III below:

TABLE III

Example Calculation Expression Text

```
<Steps>
  <If value ="$Hazard$"='low'">
    <Step value = "@CoverageCd@='EDL01'" />
  </If>
  <If value ="$Hazard$"='High'">
    <Step value = "@CoverageCd@='EDL02'" />
  </If>
</Steps>
```

A product administration system consistent with the invention may also in some embodiments implement data binding dependency management. By registering the inputs for a given behavior (e.g., rule or calculation), engines may be configured to listen for changes to any input to know when to re-fire a given rule or calculation. Thus, in the previous example, if the data manipulation calculation registers a dependency with the hazard data element parameter, the calculation may fire any time the value of hazard changes. This trigger may be performed automatically, and without needing to code for this behavior. Therefore, as a user is changing the value of hazard, the coverage code may automatically change. This type of functionality may also be replicated in some embodiments for other behaviors, including rating, data validations, etc.

In addition, a product administration system consistent with the invention may also in some embodiments implement form management using essentially the same framework for managing insurance forms associated with a policy being created. In a traditional hard coded production administration system, the rules around what forms need to be added to a policy, what data needs to be included within the forms, etc. generally must be specifically programmed within the system.

In contrast, the approach described above may be used to enable the addition of a form to be implemented in the same manner that one would add a coverage, coverage option, etc. In some embodiments, a form trigger type and a form template type may be used to manage forms, and print engine 64 may effectively start at the top of a product specification and assemble all the print instructions (e.g., as defined by form templates), as well as execute instructions (e.g., as defined by form triggers) as part of a normal rule management flow. Some form triggers, for example, may simply add a form if a parent coverage exists (e.g., using 1 . . . 1 cardinality). Other triggers may be more complicated, but like rating or data manipulations, inputs may be specified and evaluated to determine if a form is to be included. Doing so eliminates a significant amount of development work that would otherwise be needed to build and configure forms in a product administration system.

Implementation of a product configurator component to create product specifications as well as implementation of an engine to execute a product specification would be well within the abilities of those of ordinary skill having the benefit of the instant disclosure. In some embodiments, for example, a product modeling tool that outputs in a markup language such as XML may be used to generate product specifications for products that define the various containers, data elements and instruction elements suitable for defining a product. Moreover, the various types supported by ACORD or another product specification diagramming technique may be subtyped as needed to implement the additional functionality described herein. Furthermore, execution of a markup language document defining the product specification as created using a product configuration tool may likewise support subtyped containers, data elements and instruction elements created by the product configuration tool. It will also be appreciated that data validation functionality may be incorporated into a product specification such that validation may be performed by an engine in runtime without dedicated hard coding to support various types of validation.

It will also be appreciated that practically any user interface control, container, or other display element may be supported in various embodiments, including, without limitation, tabs, groups, fields, buttons, labels, text boxes, list boxes, combo boxes, radio buttons, etc. Expression text that defines such elements as well as rules, calculations, data validations, etc. may incorporate different formats and syntax, so the invention is not limited to the particular examples provided herein.

In addition, various standardized programming constructs may be used in some embodiments, including XML, AJAX. Additional tools may also be supported, e.g., a tool to generate calculation expressions that can be imported into a calculation data element. Further, different user tools may be developed for interacting with users, e.g., to provide "quick quotes" as an alternative to the full rating, issue and transactional flow used to write an insurance policy.

Figure 12:
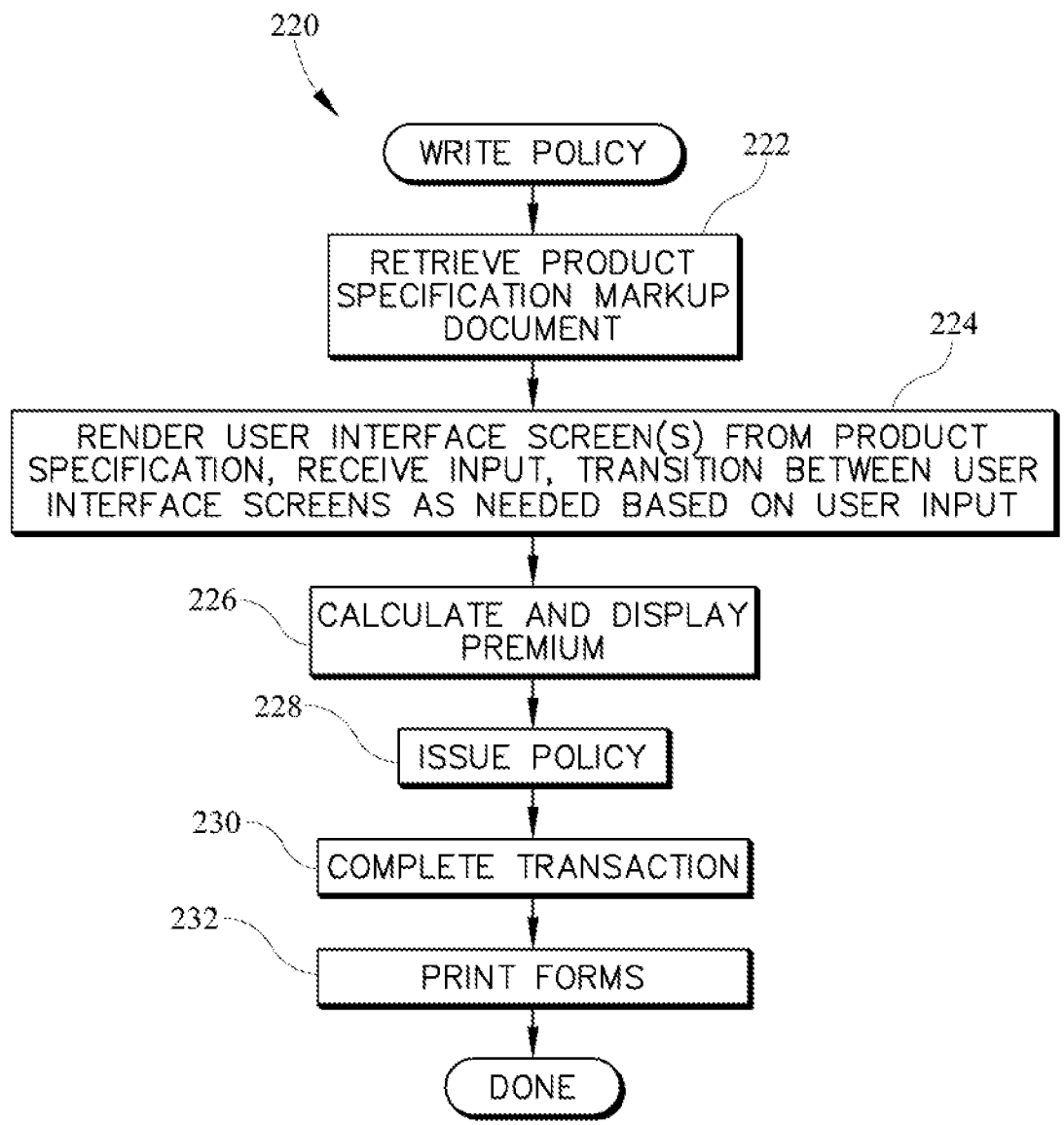
FIG. 12 is a flowchart illustrating an example sequence of operations for administering a product defined by the product specification of FIG. 5.

Now turning to FIG. 12, this figure illustrates an example sequence of operations 220 for administering an insurance product, in this case writing a policy based upon a product specification using policy administration system 50. In block 222, a product specification markup document is retrieved, and in block 224, one or more user interface screens are rendered from the product specification (e.g., using rating engine 60), and user input is received. Some user input may be directed to updating user interface controls on the current screen, while other user input may be directed to transitioning between user interface screens, and as such, transitions occur as needed, with values input on various user interface screens persisted for the policy being written. Once policy values are input, ratings engine 60 in block 226 may calculate and displays a premium, and optionally displays a premium summary including details of the calculations as discussed above. Thereafter, in block 228 the policy may be issued, and in block 230, the transaction may be completed (e.g., using transaction engine 62), e.g., to gather additional information from the policyholder, process payment, etc. In addition, if desired, the forms associated with the policy may be printed in block 232 (e.g., using stats/print engine 64). Furthermore, as data associated with the policy is modified, that data may be persisted using persistence component 66.

Although the preceding description has been described herein with reference to particular means, materials, and embodiments, it is not intended to be limited to the particular disclosed herein. Furthermore, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method, comprising:
  receiving, by one or more computer-implemented engines, a markup language document defining a product specification for insurance-related products, the markup language document including one or more containers, one or more data elements, and one or more instruction elements, each of the one or more containers defining a component of the product specification, each of the one or more data elements defining a property of the product specification, and each of the one or more instruction elements defining administration logic for the product specification; and
  dynamically interpreting the markup language document using the one or more computer-implemented engines to administer the product specification, including:
    generating a plurality of user interface screens for the product specification by interpreting at least a first subset of the one or more containers, one or more data elements and one or more instruction elements;
    transitioning between the plurality of user interface screens by interpreting at least one of the one or more instruction elements;
    and administering the product specification in response to user input received through the plurality of user interface screens, wherein administering the product specification includes generating a quote for an insurance-related product by interpreting the markup language document, and wherein generating the quote includes dynamically interpreting one or more instruction elements in the markup language document to execute a plurality of instructions encoded in the dynamically-interpreted one or more instruction elements that calculate a value for the quote, wherein the plurality of instructions encoded in the dynamically-interpreted one or more instruction elements define a rating calculation including a plurality of steps, wherein dynamically interpreting the one or more instruction elements in the markup language document includes sequencing through the plurality of steps defined in the dynamically-interpreted one or more instruction elements to generate the value for the quote, wherein at least a second subset of the one or more containers, one or more data elements, and one or more instruction elements are compatible with an insurance industry standard diagramming technique, and wherein generating the plurality of user interface screens includes generating a first user interface screen using the second subset.

2. The method of claim 1, wherein administering the product specification further includes:

creating the insurance-related product based upon the product specification; and persisting the insurance-related product.

3. The method of claim 2, wherein receiving the markup language document includes retrieving the markup language document from a repository, wherein the markup language document is a first markup language document, and wherein persisting the insurance-related product includes saving the insurance-related product in the repository as a second markup language document.

4. The method of claim 2, wherein the insurance-related product comprises an agreement.

5. The method of claim 4, wherein the insurance-related product comprises an insurance agency contract.

6. The method of claim 2, wherein administering the product specification further comprises generating a plurality of forms for the insurance-related product by dynamically interpreting one or more additional instruction elements in the markup language document using the one or more computer-implemented engines to execute a second plurality of instructions encoded in the dynamically-interpreted one or more additional instruction elements.

7. The method of claim 2, wherein the insurance-related product comprises an insurance policy, wherein the one or more computer-implemented engines comprises a rating engine configured to generate the quote for the insurance-related product using the markup language document, a transaction engine configured to perform a transaction with the insurance-related product using the markup language document, a print engine configured to print a plurality of forms defined for the insurance-related product using the markup language document, or a statistics engine configured to generate one or more statistics for the insurance-related product using the markup language document, and wherein each of the one or more computer-implemented engines is configured to dynamically interpret instructions element from the markup language document to execute instructions encoded in the dynamically-interpreted instruction elements.

8. The method of claim 2, wherein the insurance-related product comprises an insurance policy, wherein the one or more computer-implemented engines comprises a rating engine that generates the quote for the insurance-related product by dynamically interpreting the one or more instruction elements in markup language document, the method further comprising:

dynamically interpreting a first plurality of additional instruction elements in the markup language document using a transaction engine among the one or more computer-implemented engines to execute a first expression encoded in the first plurality of additional instruction elements that performs a transaction with the insurance-related product; and dynamically interpreting a second plurality of additional instruction elements in the markup language document using a print engine among the one or more computer-implemented engines to execute a second expression encoded in the first plurality of additional instruction elements that generates a plurality of forms defined for the insurance-related product.

9. The method of claim 8, wherein the transaction is a new business, endorsement, cancellation or reinstatement transaction for the insurance-related product.

10. The method of claim 2, wherein each of at least a portion of the one or more containers defines an additional interest, building, coverage, coverage modifier, coverage option, coverage part, declaration, extension, form, line of business, location, place of insurance, premium detail, prior policy, product concept, stat detail, structural, subject of insurance, or underlying policy component.

11. The method of claim 2, wherein each of at least a portion of the one or more instruction elements defines a conflict, construction helper, data validation, form template, form trigger, global form, issue helper, rating hint, requisite, screen hint, screen layout, screen wizard hint, screen wizard layout, stat, transaction helper, transaction rule or upgrade rule.

12. The method of claim 2, wherein each of at least a portion of the one or more instruction elements defines an allowed value, data manipulation, lookup or rating calculation.

13. The method of claim 2, wherein the product specification further defines one or more form template components and one or more form trigger components, each form template component defining print instructions for a form and each form trigger associating a form template component with an associated coverage.

14. The method of claim 1, wherein at least one of the one or more instruction elements defines a screen layout for at least one user interface screen for use in administering the product specification.

15. A method, comprising:

defining a product specification for an insurance-related product using a product diagramming technique, the product specification including one or more containers, one or more data elements, and one or more instruction elements, each of the one or more containers defining a component of the product specification, each of the one or more data elements defining a property of the product specification, and each of the one or more instruction elements defining administration logic for the product specification, and at least one of the one or more instruction elements defining a screen layout for at least one user interface screen for use in administering the product specification;

automatically generating a markup language document defining at least a portion of the product specification;

persisting the markup language document in a data store;

dynamically interpreting the markup language document by one or more computer-implemented engines to generate the at least one user interface screen; and dynamically interpreting one or more instruction elements in the markup language document by one or more computer-implemented engines to execute a plurality of instructions encoded in the dynamically-interpreted one or more instruction elements to generate a quote for the insurance-related product, perform a transaction with the insurance-related product, generate a plurality of forms defined for the insurance-related product, or generate one or more statistics for the insurance-related product, wherein the plurality of instructions encoded in the dynamically-interpreted one or more instruction elements define a rating calculation including a plurality of steps, wherein dynamically interpreting the one or more instruction elements in the markup language document includes sequencing through the plurality of steps defined in the dynamically-interpreted one or more instruction elements to generate the value for the quote, wherein at least a subset of the one or more containers, one or more data elements, and one or more instruction elements are compatible with an insurance industry standard diagramming technique, and wherein generating the at least one user interface screen includes generating a first user interface screen using the subset.

16. An apparatus, comprising:

at least one processing unit; and program code configured upon execution by the at least one processing unit to administer a product specification for insurance-related products using one or more computer-implemented engines by:

receiving, by the one or more computer-implemented engines, a markup language document defining the product specification, the markup language document including one or more containers, one or more data elements, and one or more instruction elements, each of the one or more containers defining a component of the product specification, each of the one or more data elements defining a property of the product specification, and each of the one or more instruction elements defining administration logic for the product specification; and dynamically interpreting the markup language document using the computer-implemented engine to administer the product specification, including:

generating a plurality of user interface screens for the product specification by interpreting at least a first subset of the one or more containers, one or more data elements and one or more instruction elements;

transitioning between the plurality of user interface screens by interpreting at least one of the one or more instruction elements; and administering the product specification in response to user input received through the plurality of user interface screens, wherein administering the product specification includes generating a plurality of forms for an insurance-related product by interpreting the markup language document, and wherein generating the plurality of forms includes dynamically interpreting one or more instruction elements in the markup language document to execute a plurality of instructions encoded in the dynamically-interpreted one or more instruction elements, wherein a first instruction among the plurality of instructions encoded in the dynamically-interpreted one or more instruction elements defines a form trigger that controls whether to generate a first form for the product specification, wherein generating the plurality of forms includes dynamically interpreting the first instruction to execute the form trigger to determine whether to generate the first form when generating the plurality of forms, wherein at least a second subset of the one or more containers, one or more data elements, and one or more instruction elements are compatible with an insurance industry standard diagramming technique, and wherein generating the plurality of user interface screens includes generating a first user interface screen using the second subset.

17. The method of claim 1, wherein administering the product specification further comprises performing a transaction with the insurance-related product by interpreting one or more additional instruction elements in the markup language document to execute a second plurality of instructions encoded in the dynamically-interpreted one or more additional instruction elements.

18. The method of claim 1, wherein administering the product specification further comprises generating one or more statistics for the insurance-related product by interpreting one or more additional instruction elements in the markup language document to execute a second plurality of instructions encoded in the dynamically-interpreted one or more additional instruction elements.

19. The apparatus of claim 16, wherein the program code is configured to administer the product specification further by generating a quote for the insurance-related product by interpreting one or more additional instruction elements in the markup language document to execute a second plurality of instructions encoded in the dynamically-interpreted one or more additional instruction elements that calculate a value for the quote.

* * * * *